3,529,010
Patented Sept. 15, 1970

3,529,010
3-CHLOROBICYCLO[1.1.0]BUTANE-CARBONITRILES
Saul C. Cherkofsky, Wilmington, Del., assignor to E. I. du Pont de Nemours and Company, Wilmington, Del., a corporation of Delaware
No Drawing. Filed Jan. 25, 1968, Ser. No. 700,372
Int. Cl. C07c *121/46*
U.S. Cl. 260—464    4 Claims

ABSTRACT OF THE DISCLOSURE 3-chlorobicyclo[1.1.0]butanecarbonitriles, useful monomers for producing polymers having the recurring unit

which can be fabricated into self-supporting films, fibers and shaped objects, are prepared by the reaction of a basic material on a 3,3-dichlorocyclobutanecarbonitrile produced by the reaction of chlorinating agents upon a 3-ketocyclobutanecarbonitrile.

BACKGROUND OF THE INVENTION

This invention relates to intermediates leading to substituted bicyclobutane compounds, homopolymers thereof and to the process for the preparation of the bicyclobutane compounds.

SUMMARY OF THE INVENTION

This invention is directed to compounds of the formula

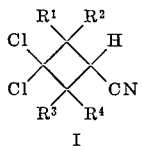

I wherein $R^1$, $R^2$, $R^3$ and $R^4$ are hydrogen or $C_1$–$C_{18}$ hydrocarbyl groups free of ethylenic unsaturation.

This invention is also directed to a process for converting above-mentioned compounds of this invention into 3-chlorobicyclo[1.1.0]butanecarbonitriles of the formula

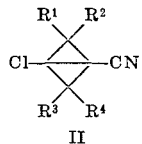

II wherein $R^1$, $R^2$, $R^3$ and $R^4$ have the same meaning as above. This process comprises reacting (a) a 3-ketocyclobutanecarbonitrile of the formula

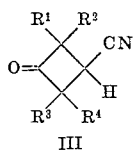

III with a chlorinating agent to produce a gem-dichloro compound of Formula I and (b) reacting the gem-dichloro compound with a basic material. The compounds of this invention are useful as intermediates for compounds of Formula II which are useful as monomers for homo- and copolymers which can be fabricated into self-supporting films, tough fibers and molded objects.

DESCRIPTION OF THE PREFERRED EMBODIMENTS

The preferred compounds of this invention are those wherein $R^1$, $R^2$, $R^3$ and $R^4$ are hydrogen. Also preferred are the compounds wherein $R^1$, $R^2$, $R^3$ and $R^4$ are lower alkyl containing 1–6 carbons. $R^1$, $R^2$, $R^3$ and $R^4$ are defined as a $C_1$–$C_{18}$ hydrocarbyl group free of ethylenic unsaturation. Examples of such hydrocarbyl groups are alkyl such as methyl, ethyl, propyl, isopropyl, butyl, isobutyl, pentyl, hexyl, heptyl, octyl, 2-ethylhexyl, decyl, nonyl, dodecyl, tetradecyl, hexadecyl, octadecyl and the like; cycloalkyl such as cyclobutyl, cyclopentyl, cyclohexyl, cycloheptyl, cyclodecyl, cyclododeyl and the like; aryl such as phenyl, naphthyl, phenanthryl, anthryl and the like; alkaryl such as tolyl, xylyl, ethylphenyl, butylphenyl, methylnaphthyl, ethylnaphthyl, methylphenanthryl and the like; and aralkyl such as benzyl, 2-phenylethyl, naphthylmethyl and the like.

The 3,3-dichlorocyclobutanecorbonitriles are produced by the reaction of a chlorinating agent with 3-keto-cyclobutanecarbonitrile. For example, the reaction of 3-keto-cyclobutanecarbonitrile with a chlorinating agent such as $SbCl_5$, $PCl_5$ and the like converts the keto group into a gem-dichloro group. Pressure is not critical in this process but the process can be conducted at subatmospheric or superatmospheric pressures. The temperature at which the process is conducted is preferably 0–25° C. however lower or higher temperatures can be used. A reaction solvent or diluent is not needed but for convenience a halogenated hydrocarbon such as chloroform, carbon tetrachlorine, methylene chloride, fluorinated hydrocarbons or a hydrocarbon such as benzene can be used. The mole ratio of the ketone to the chlorinating agent used in the process is 20:1 to 1:20 and preferably the mole ratio is 1:1 to 1:5. Time is not critical in the process and, preferably, can be 1–10 hours but shorter or longer times are operative.

3-chlorobicyclo[1.1.0]butanecarbonitrile is produced by a process comprising reacting a 3,3-dichlorocyclobutanecarbonitrile with a basic material. Examples of basic materials suitable for this process include sodium t-butoxide, potassium t-butoxide, sodium amide, sodium hydride, and the like. The process can be conducted at a temperature of —20° to 30° C., however lower or higher temperatures are operative. A reaction medium is not required for this process but a reaction medium such as ethyl ether, tetrahydrofuran, ethylene glycol dimethyl ether and the like can be used. The bicyclo compound formed by this process tends to polymerize. To avoid extensive polymerization, the process can be conveniently conducted in the presence of an inhibitor such as a free radical scavenger, for example, a phenolic compound, however the process can also be conducted without such an inhibitor.

Alternatively, the inhibitor can be added after the dehalogenation step which produces the bicyclo compound. Examples of phenolic compounds useful as inhibitors include hydroquinone, hydroquinone dimethyl ether, 2,5-di-t-butylhydroquinone and the like.

The 3-chlorobicyclo compounds of this invention can be recovered from the reaction mixture by distillation. During the distillation, it is convenient to add a phenolic inhibitor to the crude bicyclo compound. The 3-halobicyclo compound can be stored for short periods of time at low temperatures such as in liquid nitrogen or in Dry Ice without extensive polymerization. Alternately, they can be stored at higher temperatures without extensive polymerization by adding thereto a small amount of a phenolic compound.

The homopolymers of this invention are produced by free-radical initiation such as by a redox catalyst, or a peroxide, or an azo initiator such as α,α'-azobisisobutyronitrile at temperatures of 25–100° C. depending upon the initiator used. The homopolymer which is a high melting solid contains the structure.

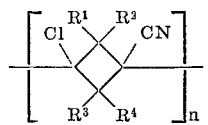

wherein $R^1$, $R^2$, $R^3$ and $R^4$ are as defined above and the term $n$ is at least 4 and preferably 10–10,000. These homopolymers have a high molecular weight and have inherent viscosities of at least 0.05 as determined as a 0.1% by weight solution in concentrated sulfuric acid at 25° C.

Alternatively, the homopolymerization can be conducted in the presence of cationic or coordination-type catalysts. Examples of cationic catalysts include $BF_3$, $HF$, $H_2SO_4$ and the like. Examples of coordination catalysts include mixtures of an aluminum trialkyl and $TiCl_4$.

The following examples further illustrate the invention.

Example 1.—3,3-dichlorocyclobutanecarbonitrile

To a stirred suspension of 20.8 g. of $PCl_5$ in 25 ml. of carbon tetrachloride under a nitrogen atmosphere at a temperature of 0° C. a solution of 9.5 g. of 3-ketocyclobutanecarbonitrile dissolved in 25 ml. of carbon tetrachloride and 25 ml. of benzene was added over a period of 1 hour. A nearly clear orange reaction mixture was obtained. The reaction mixture was poured into 150 g. of ice water, then extracted three times with 50 ml. of chloroform. The chloroform extracts were combined, extracted three times with 100 ml. of water, dried and evaporated to yield about 8.5 g. of a brown liquid. Distillation of this liquid gave 5.4 g. of a fraction boiling at 46–51° C. at 0.2 mm. Hg. This fraction was redistilled to give 3.8 g. of 3,3-dichlorocyclobutanecarbonitrile, boiling at 34–36° C. at 0.1 mm. Hg.

Analysis.—Calcd. for $C_5H_5NCl_2$ (percent): C, 40.03; H, 3.36; N, 9.34; Cl, 47.27. Found (percent): C, 40.44, 41.05; H, 3.39, 3.49; N, 9.31, 9.42; Cl, 45.37.

Example 2.—3-chlorobicyclo[1.1.0]butanecarbonitrile

A dry 250 ml. three-necked round bottom flask equipped with a magnetic stirred and a reflux condenser under a nitrogen atmosphere, containing 3.0 g. of 3,3-dichlorocyclobutanecarbonitrile and 100 ml. of ethyl ether was immersed in an ice-methanol bath having a temperature of −10° C. To the cooled solution, 3.1 g. of potassium t-butoxide was added in 10 portions over a period of 15 minutes. The mixture which turned brown was stirred at a temperature of −10° to 0° C. for 1.5 hours. To the solution were added 0.02 g. of 2,5-di-t-butylbenzoquinone, 1.5 g. of Dry Ice, 0.4 ml. of water and 2 g. of magnesium sulfate. The mixture was filtered through a bed of diatomaceous earth. The filtrate was evaporated to give 1.5 g. of a yellow liquid which is a mixture of about 15% starting material, some t-butanol and 3-chlorobicyclo[1.1.0]butanecarbonitrile. The mixture possessed an NMR absorption of two triples at 1.9 and 2.65 p.p.m. ($J\simeq1.3$ cps.) consistent with 3-chlorobicyclo[1.1.0]butanecarbonitrile. Distillation of the mixture gas 0.9 g. of 3-chlorobicyclo[1.1.0]butanecarbonitrile, a nearly colorless liquid boiling at 27° C. and 0.5 mm. Hg.

A small sample of the distilled product turned into a glassy solid on standing at room temperature for 24 hours.

Example 3

The process of Example 1 was repeated using 87.2 g. of phosphorus pentachloride and 100 ml. of carbon tetrachloride to which was added at a temperature of −10° to 0° C. over a period of 1 hour a mixture consisting of 38 g. of 3-ketocyclobutanecarbonitrile in 50 ml. of chloroform and 200 ml. of benzene. The mixture was stirred for 3 hours at 0° C. and then poured into 500 g. of ice-water. Extraction of this mixture with 5 100-ml.-portions of chloroform, extraction of the chloroform layer with 3 100 ml.-portions of water followed by drying and evaporation of the chloroform and distillation of the residue gave 15 g. of a product boiling at 52–53° C. at 0.15 mm. Hg containing 90% cyclobutanecarbonitrile and 10% 3-chlorocyclobut-2-enecarbonitrile and 5.0 g. of product boiling at 51–53° C. at 0.2 mm. Hg containing 94% 3,3-dichlorocyclobutanecarbonitrile, 5% 3-chlorocyclobut-2-enecarbonitrile and 1% 3 - ketocyclobutanecarbonitrile. These products were combined and redistilled through a 14-inch Vigreaux giving 17.9 g. of 3,3-dichlorocyclobutanecarbonitrile boiling at 38–40° C. at 0.1 mm. Hg. The product which was stored at Dry Ice temperatures crystallized to a colorless solid melting at about 20° C.

Analysis.—Calcd. for $C_5H_5NCl_2$ (percent): C, 40.03; H, 3.36; N, 3.36; Cl, 47.27. Found (percent): C, 39.97; H, 3.74; N, 8.93, 9.01; Cl, 46.84.

Example 4

Using essentially the procedure of Example 2 using 15 g. of the 3,3-dichlorocyclobutanecarbonitrile produced in Example 3 and 16.5 g. of potassium t-butoxide, 6.3 g. of 3 - chlorobicyclo[1.1.0]butanecarbonitrile was collected by distillation B.P. 36.5° C. at 1.9 mm. Hg.

Analysis.—Calcd. for $C_5H_4NCl$ (percent): C, 52.88; H, 3.55; N, 12.34; Cl, 31.23. Found (percent): C, 52.84, 52.72, 53.15; H, 3.68, 3.77, 3.79; N, 11.52, 11.60, 11.65, 12.06; Cl, 30.70.

NMR: Triplet at 1.9 p.p.m. and 2.65 p.p.m. ($J\simeq1.1$ cps. for each triplet). Mass spectrum: Calcd. molecular weight: 113 (Cl=35). Found: 113.

A sample of 3-chlorobicyclo[1.1.0]butanecarbonitrile after standing at room temperature for about 2 hours became a viscous gel.

Example 5.—Homopolymer of 3-chlorobicyclo-[1.1.0]butanecarbonitrile

In a 10 ml. round-bottomed flask equipped with a magnetic stirrer and a reflux condenser was placed under nitrogen 1.0 g. of 3-chlorobicyclo[1.1.0]butanecarbonitrile and 5 ml. of N-methylpyrrolidone. To this solution was added 0.010 g. of $\alpha,\alpha'$-azobisisobutyronitrile. The solution was heated at 60° C. for 2 hours then at 100° C. for 2 hours. An additional 0.010 g. of $\alpha,\alpha'$-azobisisobutyronitrile was added to the brownish cloudy solution and the mixture was heated at 60° C. overnight. The brown cloudy suspension was poured into 50 ml. of methanol and the solid which formed was collected by filtration and washed several times with methanol. About 0.1 g. of a very light tan powder was obtained. This powder turned brown at about 300° C. and black at about 350° C. but did not melt at temperatures up to about 375° C.

Example 6.—Homopolymer of 3-chlorobicyclo-[1.1.0]butanecarbonitrile 3-chlorobicyclo[1.1.0]butanecarbonitrile, 0.2 g., was placed in a tube at room temperature. Within 1 hour, the compound became more viscous and cloudy. After about 2 hours, a solid began to form. After 24 hours, the compound turned into completely colorless pasty solid. After one week, the compound turned into a solid. The solid was removed from the tube, washed several times with boiling methanol and filtered to give 0.2 g. of the homopolymer as an off-white powder. The polymer turned brown at temperatures of about 300° C. but did not melt at temperatures up to 375° C. The polymer was insoluble in N-methylpyrrolidone, N,N-dimethylformamide, hexafluoroisopropanol and N-methylpyrrolidone/LiCl mixture.

Example 7.—Homopolymer of 3-chlorobicyclo-[1.1.0]butanecarbonitrile

In a 15 ml. round-bottomed flask, under nitrogen, were placed 5 ml. of deaerated distilled water (flushed with nitrogen) a 1.14 of 3-chlorobicyclo[1.1.0]butanecarbonitrile. The mixture was heated to 50° C. and the following solutions were added with stirring (1) 0.3 ml. of deaerated water containing 1 drop of concentrated $H_2SO_4$ and about 0.0001 g. of ferrous ammonium sulfate hexahydrate
(2) 0.3 ml. of deaerated water containing 0.0015 g. of potassium persulfate, and
(3) 0.6 ml. of deaerated water containing 0.0075 g. of sodium metabisulfite.

The mixture became cloudy and a white precipitate formed. The mixture was stirred for 1 hour at 50–55° C. then about 20 ml. of a 1% sodium carbonate solution was added to give a mixture having a pH of about 9. The solid was collected by filtration and washed with copious amounts of water then methanol to give 0.42 g. of the homopolymer. The homopolymer was insoluble in N-methylpyrrolididone, N,N-dimethylformamide, N-methylpyrrolidone/LiCl, and hexafluoroisopropanol, but soluble in concentrated sulfuric acid. The homopolymer turned light brown at 250° C. but did not melt up to 310° C. The thermogravimetric analysis showed a weight loss of 45% when heated to 340° C. (heating rate 10° C./minute). The differential thermal analysis showed a shallow endotherm at 127° C. and a large exotherm at 317° C.

Example 8

The polymerization was repeated using essentially the same condition as in Example 7 except 2.0 g. of the monomer was used and the polymerization was conducted for 2 hours at a temperature of 50–60° C. The polymer obtained was a white powder, 0.4 g., having an inherent viscosity of 0.82 as a 1% solution in concentrated sulfuric acid at 25° C.

The compounds of this invention are useful as intermediates for the preparation of 3-chlorobicyclo[1.1.0]butanecarbonitriles which in turn are useful as monomers in the preparation of polymers. For example, 3-chlorobicyclo[1.1.0]butanecarbonitrile can be homopolymerized or copolymerized with an unsaturated monomer, such as acrylonitrile, to prepare polymers which can be fabricated into tough fibers. Such polymerization can be conducted at a temperature of about 50–100° C. in a solvent such as N,N-dimethylacetamide in the presence of a free radical initiator such as α,α'-azobisisobutyronitrile or by using an emulsion polymerization with potassium persulfate as the initiator with a reducing agent such as a metal salt or an amine at temperatures of 25–75° C.

In addition, some of the copolymers find utility in ordinary thermoplastic applications, for example as molded objects or self-supporting films. These objects can be formed by compression molding at temperatures of 150–250° C. at high pressures. The films can also be formed by casting techniques from a solvent such as N,N-dimethylacetamide.

The foregoing detailed description has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula

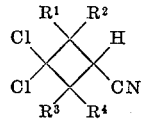

wherein $R^1$, $R^2$, $R^3$ and $R^4$ are hydrogen or lower alkyl of 1 to 6 carbons.

2. The compound of claim 1 wherein $R^1$, $R^2$, $R^3$ and $R^4$ are hydrogen said compound being 3,3-dichlorocyclobutanecarbonitrile.

3. A process for preparing a 3-chlorobicyclo[1.1.0]-butanecarbonitrile of the formula

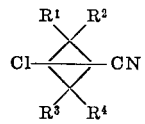

wherein $R^1$, $R^2$, $R^3$ adn $R^4$ are hydrogen or lower alkyl of 1 to 6 carbons, comprising contacting and thereby reacting a compound of the formula

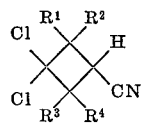

wherein $R^1$, $R^2$, $R^3$ and $R^4$ are as defined above, with an alkali metal alkoxide at about −20° C. to 30° C.

4. The process of claim 3 for producing 3-chlorobicyclo[1.1.0]butanecarbonitrile of the formula

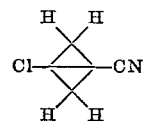

comprising reacting 3,3-dichlorocyclobutanecarbonitrile with potassium t-butoxide at about −20° C. to 30° C. of the formula

References Cited

UNITED STATES PATENTS

| | | | |
|---|---|---|---|
| 3,234,264 | 2/1966 | Blanchard | 260—464 |
| 3,340,290 | 9/1967 | Blanchard | 260—464 |
| 3,393,159 | 7/1968 | Blanchard | 260—63 X |

OTHER REFERENCES

Houben-Weyl: Methoden der Organischen Chemie, Band V/3, Haloverbindunger, pp. 912–916 (1962).
Hurd. Chemistry of the Hydrides, 1952, pp. 27–33.
Libowitz: Binary Metal Hydrides, 1965, pp. 18 & 19.
Mac Kay: Hydrogen Compounds of the Metallic Elements, 1966, pp. 32 and 33.
Moeller: Inorganic Chemistry, 1958, pp. 403–409.

JOSEPH PAUL BRUST, Primary Examiner

U.S. Cl. X.R.

260—2, 30.8, 32.6, 85.5, 465